Jan. 13, 1970

C. F. TAYLOR 3,490,016

SYNCHRO-DIGITAL CONVERTER

Filed Sept. 29, 1966

*INVENTOR.*
CLEMENT F. TAYLOR
BY Richard E. Hosley

Jan. 13, 1970   C. F. TAYLOR   3,490,016
SYNCHRO-DIGITAL CONVERTER
Filed Sept. 29, 1966   3 Sheets-Sheet 3

| SYNCHRO ROTOR ANGLE | $V_6$ | $V_7$ | $e_1$ | $e_2$ | $e_3$ | $V_D$ | $e_4$ | $e_5$ | $V_s'$ | $e_6$ | $e_7$ | $V_8$ | $U_8$ |
|---|---|---|---|---|---|---|---|---|---|---|---|---|---|
| 0 – 45    | − | − | − | + | + | − | − | − | − | − | − | − | 0 |
| 45 – 90   | + | − | − | − | − | − | − | − | − | − | − | − | 0 |
| 90 – 135  | − | + | − | − | − | + | − | − | − | − | − | − | 0 |
| 135 – 180 | + | + | + | − | + | + | − | − | − | − | − | − | 0 |
| 180 – 225 | − | − | − | + | + | + | − | + | + | − | + | + | 1 |
| 225 – 270 | + | − | − | − | − | + | − | − | + | + | − | + | 1 |
| 270 – 315 | − | + | − | − | − | − | − | − | + | + | − | + | 1 |
| 315 – 360 | + | + | + | − | + | − | + | − | + | − | + | + | 1 |

United States Patent Office 3,490,016
Patented Jan. 13, 1970

3,490,016
SYNCHRO-DIGITAL CONVERTER
Clement F. Taylor, Danvers, Mass., assignor to General Electric Company, a corporation of New York
Filed Sept. 29, 1966, Ser. No. 582,989
Int. Cl. G08c 9/00; H03k 13/02
U.S. Cl. 340—347                      3 Claims

ABSTRACT OF THE DISCLOSURE

An analog-digital converter for converting synchro position transmitter signal to a binary number. Two 120° phase shifted signals from the synchro are converted to a proportional time interval. The fixed phase sinusoidal voltages are impressed on a pair of transformers having a predetermined turns ratio to produce at their output a pair of sinusoidal signals which are a direct function of the angle of rotation of the synchro shaft. The two signals are then applied to a phase shifting network to produce a resultant output voltage which is equivalent to twice the angle of rotation of the shaft. The time interval between consecutive positive zero crossing of these two signals is then proportional to the synchro rotation and this time interval is measured in a circuit that counts the number of cycles of a high frequency pulse source during the time interval.

---

This invention generally relates to analog-digital converters and more particularly to a class of analog-digital converters used to convert a polyphase position indicating signal to a useful digital signal.

With the introduction of computers and other digital devices, there has been a great deal of research directed to obtaining means for converting analog output signals to signals which can be processed digitally. This research activity has generally produced either electromechanical or electronic conversion means for synchro devices which indicate position by means of a polyphase signal.

In one electromechanical scheme a plurality of disks driven by transformer-energized motors are rotated in response to a synchro shaft rotation. Whenever the synchro shaft position changes, the transformer energization variation causes motor and disk rotation to produce a unique pattern of conducting areas on the disks. This pattern is converted to a binary representation by a signal transfer means associated with the disks. In another electromechanical scheme a plurality of synchros are used to obtain fine and coarse readings for accurate position indications.

In one electronic scheme the time for positive zero crossing of a reference voltage and a synchro voltage are compared by a pulse generator. The time interval between zero crossings indicates the position of the synchro shaft. In another system a network provides a plurality of trigonometric functions which represent the position of the synchro by means of a plurality of synchros and flip-flop circuits. Still another electronic system utilizes oscillators to start clock trains and compares an analog voltage and an oscillator voltage to shut off the clock train at a particular point in time. In still another system the space phase between a reference and a synchro is converted to a single time phase signal by means of an amplifier and differentiation circuits to control clock gates. Other schemes have included initial conditioning of a synchro signal and a nulling of a conditioned synchro signal with a reference signal.

Each system in the prior art has required complex electronic circuitry or has included electromechanical devices. Furthermore, those electronic converter circuits which have been developed in the prior art have generally required the development of a separate reference voltage by independent circuit means to obtain the time interval signals.

It is a general object of this invention to provide a signal conversion means capable of converting the angular position of a shaft to another signal form.

Another object of this invention is to provide a signal conversion means capable of converting signals from a synchro transmitter to another signal form.

Still another object of this invention is to provide a synchro-to-digital converter capable of converting a signal from a synchro transmitter to a binary digital output.

Yet another object of this invention is to provide a synchro-to-digital converter capable of converting a signal from a synchro transmitter to a binary output without the requirement of independent reference voltage producing circuit means.

In substance, apparatus constructed in accordance with this invention converts the output signals from a shaft position indicating means to a pair of voltages displaced in time phase by an angle proportional to the mechanical displacement of the shaft and capable of being converted to a digital output signal. More specifically, the unique voltage pattern produced by a synchro transmitter is coupled to a converter circuit which produces a pair of sinusoidal voltages displaced in time phase by an angle which is linearly proportional to the synchro shaft angle. These two voltages then control circuit means which sense the time phase displacement and initiate and stop the passage of counting pulses to a binary counter so that the pulses received at the counter are converted to a binary indication of the synchro shaft position.

This invention is pointed out with particularity in the appended claims. A more thorough understanding of the above objects and advantages of this invention can be obtained by referring to the following description taken in conjunction with the appended drawings wherein:

FIGURE 1 illustrates a schematic diagram of one embodiment of a circuit for converting the voltages produced on a synchro transmitter to a pair of time phase voltages;

FIGURE 2 presents a vector diagram showing the voltages produced by a synchro such as that shown in FIGURE 1;

FIGURE 3 illustrates an alternative embodiment of a circuit similar to that shown in FIGURE 1;

FIGURE 4 presents a vector diagram showing the voltages produced by a synchro where the synchro voltages lead the synchro shaft positioned as in FIGURE 3;

Before proceeding with a discussion of this invention, it would be well to review summarily the operation of a typical synchro transmitter which produces a unique pattern of output voltages for each position of the synchro shaft. A coil, mounted on the synchro shaft and energized by a substantially constant frequency power supply, produces an alternating magnetic field which is coupled to the stator windings. As the stator windings are generally connected in an electrical Y configuration, a three-phase voltage is induced in the stator windings; and each phase voltage is displaced by a fixed space phase angle from the other phase voltages, generally 120°. Although the space phase relationship is constant, the magnitude of each phase voltage varies sinusoidally with the shaft position. For a given shaft position $\theta$ about $x'-y'$ coordinates and for a maximum output voltage magnitude V, three voltages $V_1$, $V_2$, and $V_3$ are produced having the following relationships:

(1) $\quad V_1 = V \sin \theta$
(2) $\quad V_2 = V \sin (\theta + 120°)$
(3) $\quad V_3 = V \sin (\theta - 120°)$ The following vector relationships are obtained:

(4) $\quad \overline{V}_1 = V_1 \angle \theta$
(5) $\quad \overline{V}_2 = V_2 \angle \theta + 120°$
(6) $\quad \overline{V}_3 = V_3 \angle \theta - 120°$ Hence, the synchro transmitter produces three phase voltages which can be represented as vectors having a fixed space phase relationship with each other which rotate with the shaft.

Figure 1:
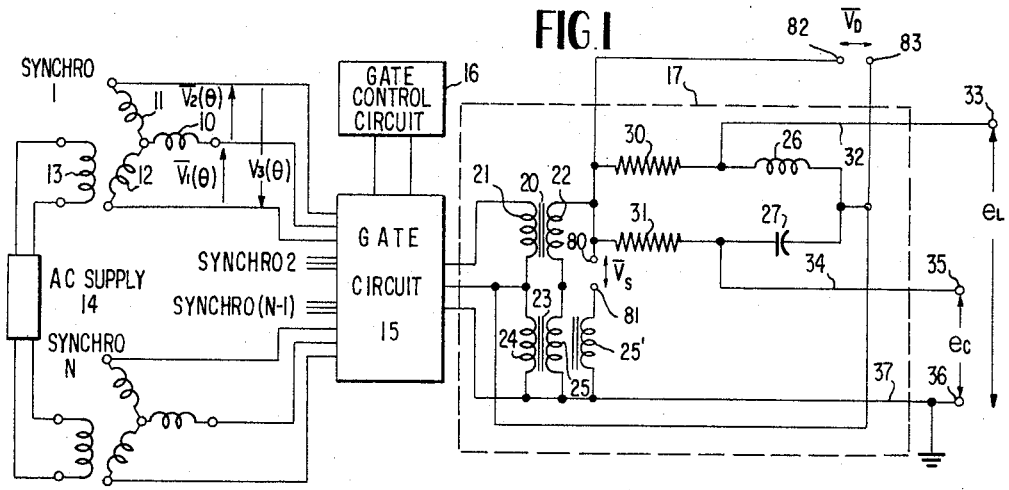

Now referring to FIGURE 1, a plurality of synchros are connected to a gate circuit. Synchro 1 comprises a plurality of stator windings 10, 11 and 12 and a rotor winding 13 which is connected to an A-C supply 14. The stator windings 10, 11 and 12 are connected in an electrical Y configuration, and each stator winding is connected to a gate circuit 15. Another synchro transmitter, synchro (N), is also shown as being energized by the A-C supply 14 and being coupled to the gate circuit 15. Optional synchro transmitter inputs to the gate circuit are also shown. The gate circuit 15, controlled by a gate control circuit 16, determines which set of synchro signals will be passed to a converter circuit 17 when a plurality of synchro transmitters are used. If only a single synchro transmitter is used, the gate circuit 15 can be eliminated so the synchro transmitter is connected directly to the converter circuit 17.

Figure 2:
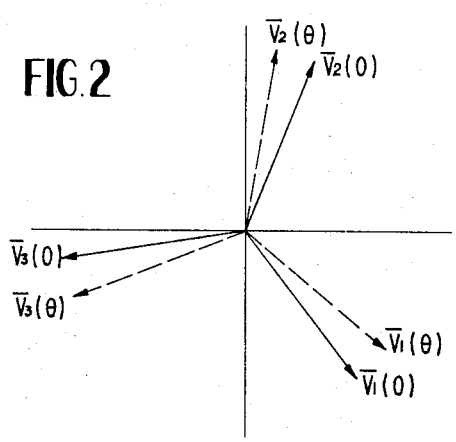

The voltages produced by the stator windings are shown in FIGURE 2 with a voltage represented by a vector. $\overline{V}_1(\theta)$ is produced between the terminals of the stator windings 10 and 12; $\overline{V}_2(\theta)$, between the stator windings 10 and 11; and $\overline{V}_3(\theta)$, between the stator windings 11 and 12.

The converter circuit 17 shown in FIGURE 1 comprises a first transformer 20 having a primary 21 and a secondary 22 and a second transformer 23 having a primary 24 and two secondaries 25 and 25'. The primaries 21 and 24 are connected in series and are energized by the synchro selected by the gate circuit 15. In the following discussion it is assumed that synchro 1 is connected to the converter circuit 17 so the primary 24 is energized by the voltage represented by the vector $\overline{V}_1$ while the transformer primary 21 is energized by the voltage represented by the vector $\overline{V}_2$. A common junction formed by interconnecting one terminal of each of the primaries 21 and 24 in series is connected to a common junction formed by an inductor 26 and a capacitor 27. Secondaries 22 and 25 are connected in series and one terminal of the resulting series connection constituted by the free terminal on the secondary 22 is connected to a resistor 30, which is also connected to the inductor 26, and to a resistor 31, which is also connected to the capacitor 27. The other free secondary terminal on secondary 25 is grounded and is also connected to the terminal on the stator winding 12. A conductor 32 couples a signal from a junction formed by the inductor 26 and the resistor 30 to a first output terminal 33. Signals produced at a junction formed by the resistor 31 and the capacitor 27 are coupled by a conductor 34 to a second output terminal 35. A grounded output terminal 36 is connected to the secondary 25 by a conductor 37. For purposes of future discussion, the voltage from the output terminal 36 to the first output terminal 33 is designated $e_L$ while the voltage produced between the grounded output terminal 36 and the second output terminal 35 is designated $e_C$. The voltages $e_C$ and $e_L$ are proportional to the synchro shaft position when certain relationships between the various elements are provided. In order to understand the nature of these relationships, it will be helpful to analyze the converter circuit 17 mathematically using some simple vector analysis.

Let $T_{20}$ = the turns ratio of the transformer 20;
$T_{23}$ = the turns ratio of the transformer 23;
R = the resistance of either the resistor 30 or the resistor 31;
C = the capacitance of the capacitor 27; and
L = the inductance of the inductor 26.

Then, if $V_0$ equals the voltage across the secondaries 22 and 25, (7) $\quad V_0 = T_{20} V_2 + T_{23} V_1$ Substituting Equations 1 and 2 in Equation 7, (8) $\quad V_0 = V T_{20} \left[ \left( \frac{T_{23}}{T_{20}} - \frac{1}{2} \right) \sin \theta + \frac{\sqrt{3} \cos \theta}{2} \right]$ If (9) $\quad T_{20} = 2 T_{23}$ then

(10) $\quad V_0 = \frac{\sqrt{3} \, V T_{20} \cos \theta}{2}$ and if

(11) $\quad T_{20} = \frac{2\sqrt{3}}{3} \quad T_{23} = \frac{\sqrt{3}}{3}$ then

(12) $\quad V_0 = V \cos \theta$

Therefore, $V_0$ varies in magnitude as a voltage vector $\overline{V}_0$ displaced 90° in space phase from the vector $\overline{V}_1$.

If the mechanical zero position of the rotor is taken so the voltages $V_1$ and $V_0$ are expressed by Equations 12 and 13,

(12) $\quad V_1 = V \sin (\theta + 45°) = V \cos (\theta - 45°)$ and

(13) $\quad V_0 = V \sin (\theta - 45°) = V \cos (\theta + 45°)$ and if the network constituted by the inductor 26, the capacitor 27, and the resistors 30 and 31 produces voltages $e_C$ and $e_L$, the voltages $e_C$ and $e_L$ can be defined mathematically, using well-known A-C network theory, as follows:

(14) $\quad e_C = V_0 + (V_1 - V_0) \left( \frac{R}{R + \frac{1}{jwC}} \right) = \frac{V_0 + jwCRV_1}{1 + jwCR}$ and

(15) $\quad e_L = V_0 + (V_1 - V_0) \left( \frac{R}{jwL + R} \right) = \frac{RV_1 + jwLV_0}{R + jwL}$ If

(16) $\quad R = \frac{L}{C}$ and if

(17) $\quad \frac{wL}{R} = wCR = 1.0$ at a given frequency, $f$, the voltages $e_C$ and $e_L$ can be expressed as

(18) $\quad e_C = \frac{V_0 + jV_1}{1 + j}$ and

(19) $\quad e_L = \frac{V_1 + jV_0}{1 + j}$

Substituting Equations 12 and 13 into Equations 18 and 19, it can be shown that

(20) $$\phi_C - \phi_L = 2\theta$$

so that the voltage $e_C$ leads the voltage $e_L$ in time phase by an angle which is twice the angle of the synchro rotor 13.

Equations 16 and 17, calibration equations for the converter circuit 17, imply that errors result whenever a frequency change occurs. However, this error is minimal because the errors can be shown to be fourth harmonic functions of the angle, to reach a maximum error of less than 0.2% and to be entirely acceptable under normal operating frequency deviations of ±5%. Furthermore, the error can be shown to be less than calibration errors. Similar analysis reveals that the calibration error follows a fourth harmonic characteristic so that the calibration of the phase shift network is not critical.

Figure 5:
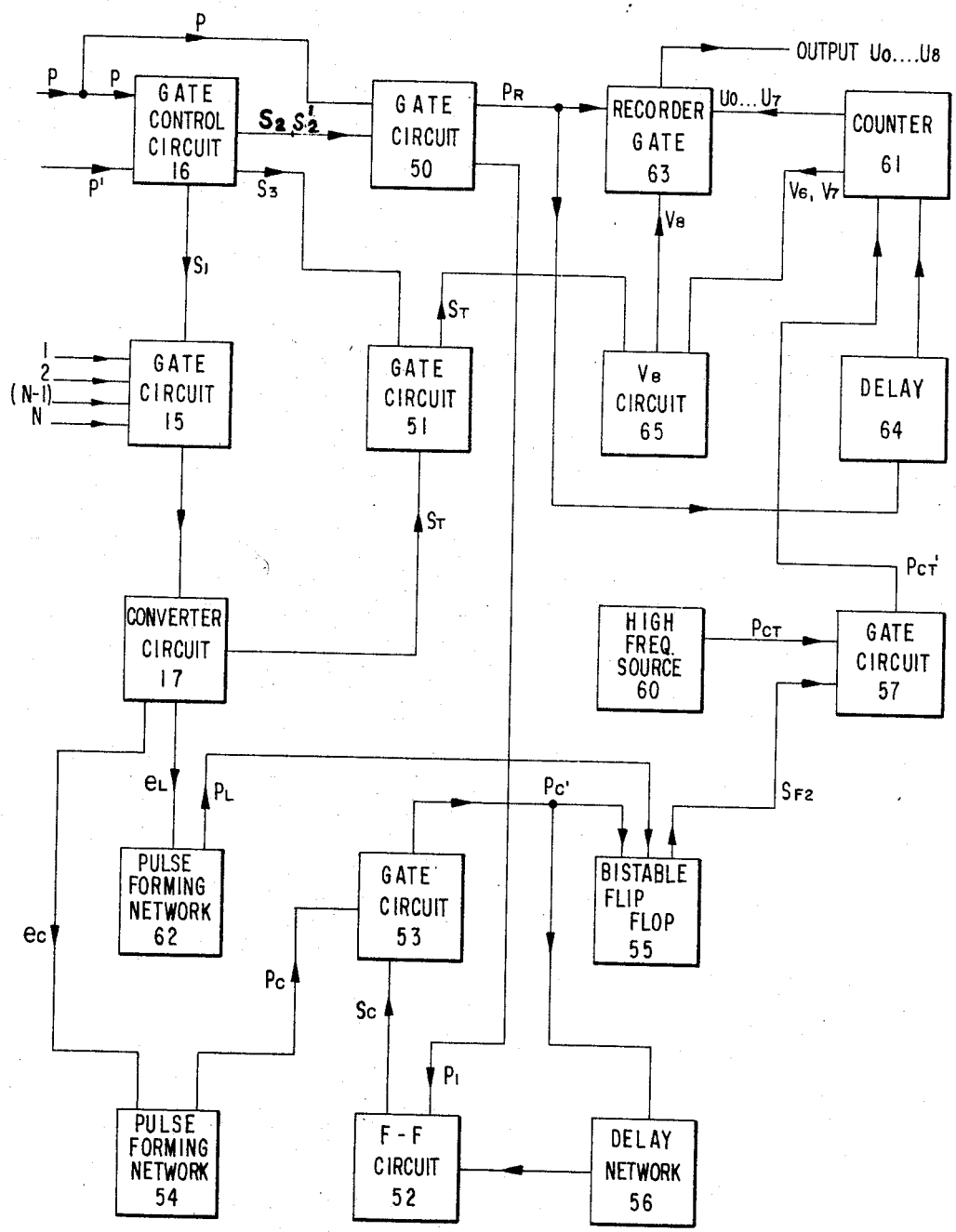
FIGURE 5 illustrates one embodiment of a circuit for converting the time phase voltages produced by the circuits shown in FIGURES 1 and 3 to a binary output.

Therefore, by selecting parameters for the converter circuit 17 according to the calibration equations, the converter circuit 17 produces a voltage $e_C$ which leads a voltage $e_L$ in time phase by an angle which is twice the synchro shaft angle. If the voltages $e_C$ and $e_L$ are coupled to a circuit such as shown in FIGURE 5, digital indication of the synchro shaft position can be obtained. It is emphasized here that the two voltages are produced solely by the output voltages of the synchro transmitter; no additional external energization is required for the circuitry which produces these voltages.

Figure 3:
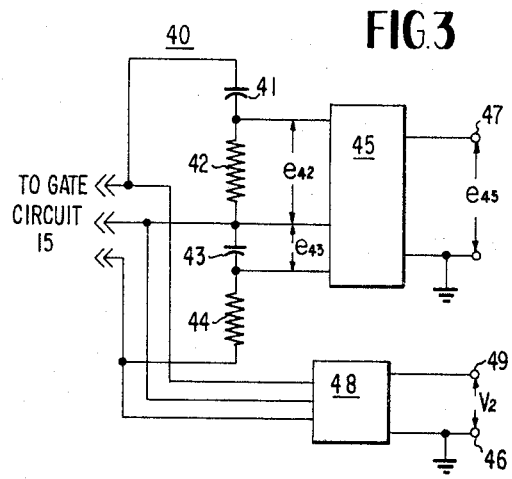

An alternative circuit embodiment for producing voltages which vary in time phase as the rotor shaft mechanical angle is shown in FIGURE 3. A converter network 40 is energized by the stator windings on a synchro transmitter as determined by the gate circuit 15. The converter network is constituted by a capacitor 41, a resistor 42, a capacitor 43, and a resistor 44 connected alternately in series between two of the phase conductors in the gate circuit 15. The third phase conductor from the gate circuit 15 is connected to a junction formed by the connection of the resistor 42 and the capacitor 43. The voltage produced across the resistor 42, $e_{42}$, and the voltage produced across the capacitor 43, $e_{43}$, are fed to a circuit 45 which produces an output voltage, $e_{45}$, between a grounded output terminal 46 and an output terminal 47 which is defined as:

(21) $$e_{45} = e_{42} - e_{43}$$

This voltage varies in time phase with respect to an alternating voltage $V_R$ having a constant maximum magnitude which is in time phase with the voltage $V_1$; $V_R$ is produced by a network 48 which can comprise any of a number of known circuits and appears between the grounded terminal 46 and an output terminal 49 from the network 48.

Figure 4:
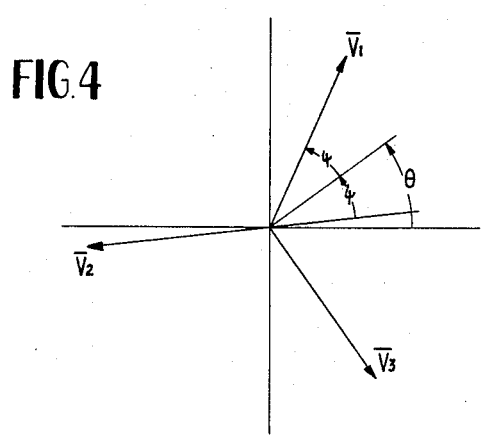

As the circuit analysis is similar to that used to describe the relationships of FIGURE 1, it is only outlined herein. Assuming that the voltage vector $\overline{V}_1$ leads the rotor by an angle 4, which is normally 30°, for synchro transmitters as shown in FIGURE 4 and letting

(22) $$V_1 = V \sin(\theta + 4)$$

and

(23) $$V_2 = V \sin(\theta - 4)$$

then

(24) $$\frac{e_{42}}{V_1} = \frac{jwC_{41}R_{42}}{1 + jwC_{41}R_{42}}$$

and

(25) $$\frac{e_{43}}{V_2} = \frac{1}{1 + jwC_{43}R_{44}}$$

If Equations 24 and 25 are substituted in Equation 21, it can be shown that

(26) $$e_{45} = 0.75 e^{j\theta}$$

Thus, the network output signal voltage $e_{45}$ leads the reference voltage $V_R$ by a time phase angle which indicates the synchro rotor position directly. This alternative converter network 40 can be substituted for the converter circuit 17 by substituting terminals 46, 47, and 49 for the terminals 36, 35, and 33, respectively. In addition, some minor changes in subsequent circuitry are also required to compensate for the difference in proportionality constants because the relationship $2\phi = \theta$ exists when the converter circuit 17 is used whereas the relationship $\phi = \theta$ exists when the converter network 40 is used.

Although the transformers 20 and 23 shown in FIGURE 1 and some of the circuitry subsequently discussed in relationship to FIGURE 5 can be eliminated, some circuitry must be used to convert one of the synchro voltages to the reference voltage $V_R$. Hence, in some situations the circuitry involved may be more complex than that involved with FIGURE 1 and may not be warranted. Furthermore, frequency errors are of first order in the circuitry shown in FIGURE 3. Therefore, whether the converter circuit 17 or the converter network 40 will be used will ultimately depend upon the particular application to which the converter is to be adapted.

Signals from either converter circuit 17 or converter network 40 are easily transposed to a binary output by any number of known circuits. In order to describe a complete synchrodigital converter, the circuit shown in FIGURE 5 will serve to show how either the voltages $e_C$ and $e_L$ or the voltages $V_R$ and $e_{45}$ can be converted to the binary output. To simplify this explanation, only the operation of the converter circuit 17 is discussed as the operation for the circuitry is the same in both instances with the exception of some minor changes which will be discussed. FIGURE 5 presents only an information flow schematic diagram because the detailed construction of most of the circuits depicted therein is well known to those skilled in the art.

The gate control circuit 16 is energized by a first source of timing pulses P and an optional source of reset pulses P' which reset the gate control circuit 16 periodically. Alternatively, the gate control circuit 16 could be designed to reset itself, thereby eliminating the requirement for a reset pulse source. Typically, the gate control circuit 16 would be constituted by a plurality of flip-flop circuits for the production of a plurality of output signals designated $S_1$ and $S_2$; the signal $S_3$ is required only when the converter circuit 17 is used.

Assuming a pulse P' has reset the gate control circuit 16, on the first subsequent pulse $P_1$, the signal $S_1$ opens the gate circuit 15 to pass signals from one synchro transmitter to the converter circuit 17. The gate circuits 50 and 51, energized by the signals $S_2$ and $S_3$, remain closed for a predetermined number of pulses $P_N$ to permit transients in the converter circuit 17 to decay. During this transient decay period, the gate control circuit 16 can cause other synchro signals to be passed to other converter networks if such networks are used. After the pulse $P_N$, the signal $S_2$ opens the gate circuit 50 so that the pulse $P_{N+1}$ produces a pulse $P_1$ which changes the output of a flip-flop circuit 52 to energize one input of an "and" gate circuit 53 with a signal $S_C$.

A pulse-forming network 54, coupled to the output of the converter circuit 17, produces a pulse $P_C$ each time the voltage $e_C$ passes through zero in the positive direction. When such a pulse $P_C$ is produced, it is coupled to the other input of the "and" gate circuit 53 and is passed therethrough as a pulse $P_C'$ if the signal $S_C$ is present. $P_C'$ changes the state of a bistable flip-flop circuit 55 and energizes a delay network 56 which resets the flip-flop circuit 52 after a short time delay to prohibit the passage of additional pulses $P_C$. When the bistable flip-flop circuit 55 is set into one state by the pulses $P_C'$, an "and" gate circuit 57 has one input energized, the other input being continually energized by counting pulses $P_{CT}$ from a high-frequency pulse source

60. Under these conditions, counting pulses $P_{CT}$ are transferred to a counter circuit 61, usually constituted by a plurality of flip-flop circuits in a known configuration, which counts the number of pulses. Pulses $P_{CT}$ enter the counter circuit 61 until the voltage $e_L$ goes through zero in the positive direction whereupon a pulse $P_L$ is produced by a pulse-forming network 62 and is coupled to the bistable flip-flop circuit 55 to reset that circuit, close the "and" gate circuit 57, and thereby stop the advance of the counter circuit 61. Hence, the counter circuit 61 has advanced to a count which is determined by the time interval between the positive zero crossings of the voltages $e_C$ and $e_L$ and indicates the synchro rotor position.

Subsequent to the signal $S_2$ which open the gate circuit 50, but after a final count is on the counter 61, another signal $S_2'$ from the gate control circuit 16 causes a recording command pulse $P_R$ to be transmitted to a recorder gate circuit 63 and to a delay network 64. Application of the pulse $P_R$ to the recorder gate circuit 63 permits the binary number on the counter circuit 61 and another digit from an ambiguity-resolving, or $U_8$-determining, circuit 65 to be read out of the circuit. The ambiguity-resolving circuit 65 is required under some circumstances when the converter circuit 17 is used, and its operation will be discussed hereinafter. The output of delay circuit 64 is used to clear the counter circuit 61 to prepare it for the next counting cycle.

In most applications in which reasonable accuracy is required, an eight-digit binary number including the digits $U_0, U_1 \ldots U_7$ is used. Therefore, if the converter network 40 were being used, each binary number produced by the counter circuit 61 would validly indicate the position of the rotor 13. However, when the converter network 17 is used, an ambiguity is introduced because $2\theta = \phi$ so that a given value for $\phi$ can indicate either of two positions of the rotor 13 which are 180° out of phase. In order to resolve this ambiguity, the ambiguity-resolving circuit 65 is used to determine in which sector of the circle the rotor 13 is located. The output of this circuit is a digit $U_8$ which can be added to the binary output in the recorder gate circuit 63 to produce a nine-digit binary output number. The following table shows the correlation between rotor angles, the binary count from the circuit 61 as represented by the digits $U_6$ and $U_7$, the voltages indicating those digits, $V_6$ and $V_7$, and the values which could be assigned to $U_8$ and a voltage producing that digit, $V_8$. By utilizing the addition of the digit $U_8$, any ambiguity can be resolved.

| Θ (degrees) | $U_8$ | $V_8$ | $U_7$ | $V_7$ | $U_6$ | $V_6$ |
|---|---|---|---|---|---|---|
| 0–45 | 0 | − | 0 | − | 0 | − |
| 45–90 | 0 | − | 0 | − | 1 | + |
| 90–135 | 0 | − | 1 | + | 0 | − |
| 135–180 | 0 | − | 1 | + | 1 | + |
| 180–225 | 1 | + | 0 | − | 0 | − |
| 225–270 | 1 | + | 0 | − | 1 | + |
| 270–315 | 1 | + | 1 | + | 0 | − |
| 315–360 | 1 | + | 1 | + | 1 | + |

Each of the binary digits $U_0$ through $U_8$ appears as a voltage having a positive or negative polarity which represents the 1 or 0 state, respectively. A voltage vector $\overline{V}_s$ about the $x$–$y$ coordinates in FIGURE 2 can be generated so that its polarity is directly correlated to the voltage $V_8$. However, for angles close to 0° and 180° the polarity of such a vector $\overline{V}_s$ is ambiguous because in actual working conditions certain unpredictable circuit parameter variations do occur. In these regions $U_8$ cannot be accurately produced merely by looking to the polarity; if, however, the vector $\overline{V}_s$, the voltages $V_6$ and $V_7$ and another voltage $V_D$, displaced 90° from $\overline{V}_s$, are combined, an accurate determination of $U_8$ is possible. Qualitatively, the first step is to determine whether the angle of the synchro rotor 13 lies in one of the ambiguous regions which include the angles of 0°±45° and 180°±45°. If the rotor angle is not within one of these regions, the polarity of the voltage vector $\overline{V}_s$ directly determines the value of $U_8$. If the rotor angle is within one of the ambiguous regions, the outputs of the converter circuit 17 and the counter circuit 61 are combined to determine the value of $U_8$.

Figures 6, 7:
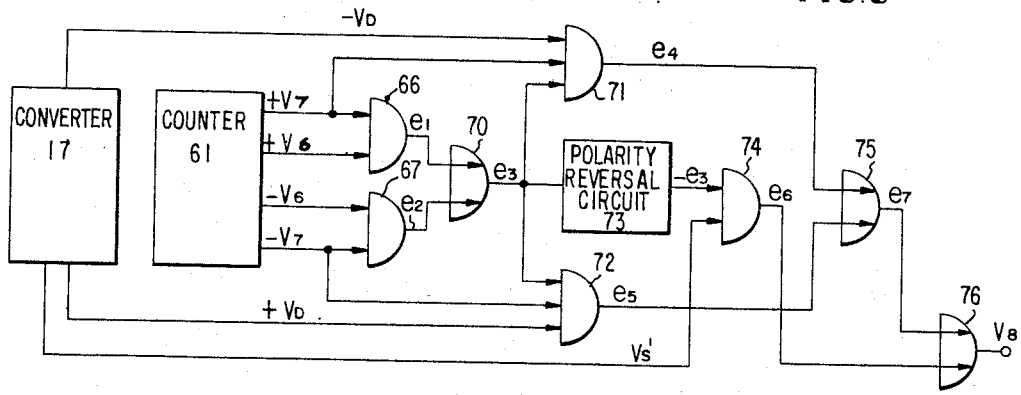
FIGURE 6 illustrates a circuit for eliminating ambiguities which occur in the circuit shown in FIGURE 1.
FIGURE 7 presents a logic table to show voltage polarities at various locations within the circuit shown in FIGURE 6.

A circuit for obtaining $U_8$ is shown in FIGURE 6 including general connections between the converter circuit 17 and the counter circuit 61. In order to understand more clearly how $U_8$ is determined, FIGURE 7 presents a logic table. The voltages representing the digits $U_6$ and $U_7$, $V_6$ and $V_7$ are fed through an "and" circuit 66, the output of which is $e_1$. Voltages $-V_6$ and $-V_7$, which represent reverse polarities of $V_6$ and $V_7$ and which are usually directly available from the counter circuit 61, are fed to another "and" circuit 67, the output voltage of which is $e_2$. If $V_6$ and $V_7$ are both positive, $e_1$ is positive; if both $V_6$ and $V_7$ are negative, $e_2$ is positive. $e_1$ and $e_2$ are fed to an "or" circuit 70 to produce a positive voltage $e_3$ whenever either $e_1$ or $e_2$ is positive. $e_3$ is fed to an "and" circuit 71, an "and" circuit 72, and an inverter circuit 73.

The "and" circuit 71 is also energized by $V_7$ and $-V_D$. $V_D$ is positive for angles of 90° through 270° as shown in FIGURE 7. $e_4$, the output of the "and" circuit 71, is positive only when the rotor 13 is between 315° and 360°; $e_5$, the output of the "and" circuit 72 which is energized by $e_3$, $-V_7$ and $V_D$, is positive for rotor angles from 180° through 225°. The output from the inverter circuit 73, $-e_3$, is applied to an "and" circuit 74 as is a voltage $-V_s$ which is also taken directly from the converter circuit 17. The "and" circuit 74 produces a positive output voltage $e_6$ when the rotor 13 is in a range of angles from 225° to 315°. $e_4$ and $e_5$ are applied to an "or" circuit 75 to produce a positive output voltage $e_7$ for rotor angles of 180° through 225° and 315° through 360°. As both the outputs $e_6$ and $e_7$ are applied to the input of an "or" circuit 76, an output voltage $V_8$ can be obtained which is positive for rotor angles of 180° to 360°. Hence, the ambiguity-resolving circuit 65 shown in FIGURE 5 and in detail in FIGURE 6 produces an output voltage $V_8$ which accurately indicates the position of the rotor 13.

Referring again to FIGURE 5, the various signals from the converter circuit 17 are transmitted to the gate circuit 51 as a signal $S_T$. Subsequent to the application of the signal $S_2$ and prior to the production of the signal $S_2'$, a signal $S_3$ is applied to the gate circuit 51 to permit the signal $S_T$ to be transmitted to the ambiguity-resolving circuit 65. When the subsequent recording command pulse $P_R$ is applied to the recorder gate circuit 63, $U_8$ is read out with the counter binary number as a ninth digit.

The ambiguity-resolving circuit 65 is required only if the converter circuit 17 is to be used in conjunction with a synchro in which the rotor revolves through an angle which exceeds 180°. The voltage vectors $\overline{V}_s$ and $\overline{V}_D$ are obtained from the converter circuit 17 and the circuitry in FIGURE 1 is exemplary. A terminal 80 is connected directly to the junction formed by the interconnection of the secondary 22 and the resistors 30 and 31. A terminal 81 is coupled to ground through the transformer secondary 25'; and a voltage appears between the terminals 80 and 81 which varies as the vector $\overline{V}_s$ when the turns ratio is unity. Terminals 82 and 83 are respectively connected to the terminal 80 and the junction formed by the inductor 26 and the capacitor 27; a voltage varying as the voltage vector $\overline{V}_D$ appears therebetween. If the rotor travel is less than 180° and the converter circuit 17 is used or if the converter network 40 is used, then the ambiguity-resolving circuit 65 can be eliminated.

In summary, the position of a synchro transmitter rotor is converted to a time interval signal by a network which is dependent only upon the synchro transmitter voltages in accordance with this invention. By manipulating the voltages from the synchro transmitter by a plurality of impedance means, two alternating current voltages are obtained which vary in time phase with one another by an angle which represents the synchro rotor angle. These voltages are easily converted to binary or other digital outputs by any number of known circuits.

What is claimed as new and desired to be secured by Letters Patent of the United States is:

1. A shaft position indicating means including a stator coil, a shaft,
   means mounted on the shaft for inducing a voltage pattern on the stator coil for each shaft position:
   (a) means for deriving a pair of sinusoidal voltages from said stator coil means, said voltages having a fixed space phase relationship with respect to each other and magnitudes which vary sinusoidally as a function of the angle of rotation of said shaft.
   (b) means for converting the space phase relationship of said pair of sinusoidal voltages so that the space phase relationship between said voltages there is by an angle which is twice the angle of rotation of said shaft, including
       (1) first and second transformer means, each having primary windings energized by a respective one of said pair of sinusoidal voltages of fixed phase relationship, the said transformers respectively having turns ratios of $\sqrt{3}/3$ and $2\sqrt{3}/3$ respectively to produce output voltages which are proportional to the angle of rotation of said shaft,
       (2) impedance means coupled to the output of said transformers to shift the phase of the output voltages from said transformers so that the space phase relationship there is by an angle which is twice the angle of shaft rotation,
   (c) to measure the time interval between said two spaced phase displaced voltages and to produce a digital output representative of said angle of rotation.

2. A conversion circuit as recited in claim 1
   (a) first and second "and" circuits energized by said two highest digits from said indicating means;
   (b) a first "or" circuit energized by the output of said first and second "and" circuits;
   (c) a third "and" circuit energized by said highest output voltage and a voltage displaced in phase from said voltages produced on the stator coil and by the output voltage of said first "or" circuit;
   (d) a fourth "and" circuit energized by said highest digit, the voltage from the output of said first "or" circuit and another voltage displaced in phase from said stator voltage;
   (e) a second "or" circuit energized by the outputs of said third and fourth "and" circuits;
   (f) means for reversing the polarity of the output of said first "or" circuit;
   (g) a fifth "and" circuit energized by the output of said polarity reversal circuit and by another voltage displaced in phase from said voltages produced on said stator coil; and
   (h) a third "or" circuit energized by the outputs of said second "or" circuit and said fifth "and" circuit to produce an output voltage which has a first polarity for rotor angles from 0°–180° and a second polarity for rotor angles from 180°–360°.

3. The system as defined in claim 2 including an ambiguity resolving circuit which is energized by the two highest digits of the digital output and by voltages from said conversion means to produce an output voltage which has a positive plurality when the rotor angle is in the region from 180°–360° and a negative polarity when the rotor is in the region from 0°–180°.

References Cited

UNITED STATES PATENTS

| | | | |
|---|---|---|---|
| 3,134,098 | 5/1964 | Herzl | 340—347 |
| 3,325,805 | 6/1967 | Dorey | 340—347 |
| 2,894,256 | 7/1959 | Kronacher | 340—347 |
| 3,071,324 | 1/1963 | Schroeder et al. | 340—347 |
| 3,147,473 | 9/1964 | Uyeyski | 340—347 |
| 3,255,448 | 6/1966 | Sadvary et al. | 340—347 |
| 3,358,280 | 12/1967 | Dougherty et al. | 340—347 |

MAYNARD R. WILBUR, Primary Examiner

J. GLASSMAN, Assistant Examiner